United States Patent [19]
Petrich et al.

[11] Patent Number: 5,248,167
[45] Date of Patent: Sep. 28, 1993

[54] INTERCHANGEABLE PROCESS CONNECTION RESISTANT TO INSTALLATION ERRORS

[75] Inventors: William E. Petrich, Golden Valley; Charles A. Glaser, Eagan, both of Minn.

[73] Assignee: Rosemount Inc., Eden Prairie, Minn.

[21] Appl. No.: 909,732

[22] Filed: Jul. 7, 1992

Related U.S. Application Data

[63] Continuation of Ser. No. 757,975, Sep. 12, 1991, abandoned.

[51] Int. Cl.$^5$ .............................................. F16L 23/00
[52] U.S. Cl. ........................................ 285/23; 73/756; 285/368; 285/12; 285/137.1
[58] Field of Search ........................ 285/12, 13, 23, 24, 285/26, 412, 368, 137.1; 73/706, 756, 201; 137/356, 340, 360, 343, 597, 884, 886

[56] References Cited

U.S. PATENT DOCUMENTS

| | | | |
|---|---|---|---|
| 2,871,881 | 2/1959 | Hewson | 137/597 |
| 3,468,561 | 9/1969 | Balitsky et al. | 285/23 |
| 3,817,283 | 6/1974 | Hewson | 137/608 |
| 4,182,362 | 1/1980 | Hewson et al. | 137/340 |
| 4,193,420 | 3/1980 | Hewson | 137/356 |
| 4,319,492 | 3/1982 | Hewson et al. | 73/756 |
| 4,466,290 | 8/1984 | Frick | 73/756 |
| 4,609,046 | 9/1986 | Schawann et al. | 285/24 |
| 4,738,276 | 4/1988 | Adams | 137/343 |
| 4,745,810 | 5/1988 | Pierce et al. | 73/756 |
| 4,833,922 | 5/1989 | Frick et al. | 73/756 |
| 4,920,626 | 5/1990 | Nimberger | 285/219 |
| 4,932,836 | 6/1990 | Boster | 285/24 |
| 4,993,754 | 2/1991 | Templin, Jr. | 285/189 |
| 5,083,586 | 1/1992 | Akamatsu | 137/343 |
| 5,094,109 | 3/1992 | Dean et al. | 73/706 |

FOREIGN PATENT DOCUMENTS 2424839 12/1975 Fed. Rep. of Germany.

Primary Examiner—Eric K. Nicholson
Attorney, Agent, or Firm—Kinney & Lange

[57] ABSTRACT

An assembly for aligning and supporting an adapter flange for connecting fluid pressures to a pressure sensor body in place on the body and to keep the flange in an unsealed condition to prevent pressurizing the body and flange until installation of permanent fasteners. The support fasteners keep the flange oriented in its normal usable position, but the fasteners retain the flange spaced from the body sufficiently so that the flange will not seal. This will prevent accidentally pressurizing the flange and pressure sensor body until permanent fasteners have been installed. The pressure sensor body is provided with threaded openings for receiving permanent fasteners and the body and flange are shipped with at least one extra set of permanent fasteners different in length from the fasteners used on the flange to permit adding adapters for a process correction. The threaded openings in the body are counter bored an amount selected so that when a different thickness adapted is used for process correction, only the correct length fasteners will be capable of being threaded into the body bores.

11 Claims, 3 Drawing Sheets

INTERCHANGEABLE PROCESS CONNECTION RESISTANT TO INSTALLATION ERRORS

This is a continuation of application Ser. No. 07/757,975, filed Sep. 12, 1991 now abandoned.

BACKGROUND OF THE INVENTION

The present invention relates to fasteners for supporting and aligning a connecting flange on a transmitter body before permanent fasteners are installed. The flange is retained by the supporting and aligning fasteners in an unsealed condition so that if fluid pressure is supplied to the flange prior to installation of permanent fasteners, the fluid will leak freely and not build up pressure, which could result in sudden release. The invention also relates to providing permanent fastener bolts that are threadable into provided threads on the body only when the proper length bolt is used to insure full required thread engagement.

In the use of process control pressure transmitters, which include pressure sensor bodies having internal pressure sensors, several different adapters for connecting the fluid pressure piping from a process line to the pressure body are required for accommodating various pressure connections and user requirements in individual process equipment. For example, it is normal to provide a standard coplanar flange with one-quarter inch pipe tap connections installed at the factory with suitable permanent fasteners. One-half inch pipe thread mounting adapters that can be put on in the field are available. A standard coplanar flange also can be used with a three-valve manifold, and flange adapters are then also needed on the input side of the manifold. The thickness of the bolt receiving parts that are mounted to the transmitter body differs in each of these configurations, and thus each configuration requires a different length of permanent mounting bolt. In order to standardize shipments, three different sets of mounting bolts are shipped with each transmitter, including the standard set installed to hold the coplanar flange by itself.

The coplanar flange is also mounted by two alignment or temporary mounting screws, so if the permanent fastener bolts are removed for any reason, including change of input configuration, the coplanar flange remains supported and aligned in place on the transmitter. The alignment screws are to be used only for aligning and temporarily supporting the flange and body together if changes in the flange configuration are made. When the coplanar flange is mounted at the factory directly to the sensor body, short (first) permanent mounting bolts are used. If one-half inch pipe adapters are added to the flange, the first bolts have to be removed, and longer bolts which pass through the adapters and the flange installed. The three-valve manifold also mounted on the flange requires longer than standard bolts. If the installer does not install the longer permanent mounting bolts when changing input configuration and applies pressure, the alignment screws used on previous transmitters can fail. Also, if there is an attempt to install shorter bolts where longer ones are needed (if the installer is totally inattentive), the prior shorter bolts may be slightly engaged in the threads of the transmitter body. The alignment screws that are holding the flange in place do not have sufficient strength to hold the flange against pressure loads. The threads of the erroneously installed main mounting bolts may strip, and the alignment screws will fail, resulting in damaging the transmitter.

SUMMARY OF THE INVENTION

The present invention relates to a fastening arrangement for aligning and mounting a flange to a pressure sensor or transmitter body and providing a set of alignment fasteners which are stopped in a position so that the flange is not sealed against the body when only the alignment fasteners are in place. A gap is provided between one flange surface and the body surface on which inlet ports to the sensor or transmitter are formed, so that if the flange is connected to fluid and pressurized prior to the time of installation of permanent fastener bolts which can withstand the loads involved under pressure, the process fluid will leak and alert the operator to the fact that the permanent fastener bolts have not been installed. The leak occurs before building up pressure in the transmitter, which can cause failure of the alignment fastener.

Specifically, as shown, a stud is used for slidably guiding the pressure correction flange and a second shoulder bolt is used for aligning and supporting the coplanar flange in place and for controlling the spacing of the flange relative to the surface of the body on which the flange is mounted. The shoulder bolt has a shoulder stop surface that seats against the surface of the transmitter or sensor body and has a length between the shoulder surface and the head that is greater than the thickness of the flange so that the flange will be spaced from the body when the flange is urged against the head of the shoulder bolt. There are other types of stops that can also be used, of course, such as a sleeve over a bolt that fixes the length of tightening of the fastener, or a shoulder on an outer end of a stud with threads for a nut outwardly of the stud shoulder that likewise controls the effective length to a length that is greater than the thickness of the flange being supported.

The body of the transmitter or sensor has internal fastener threads for the permanent fasteners recessed inwardly from the surface against which the flange seats. The depth or length of the recess is coordinated with the length of fasteners that are provided for the transmitter so that only the correct length fasteners for the flange arrangement being attached will work with a selected arrangement of flanges and adapter available for the transmitter or sensor body.

DETAILED DESCRIPTION OF THE PREFERRED EMBODIMENTS

Figure 1:
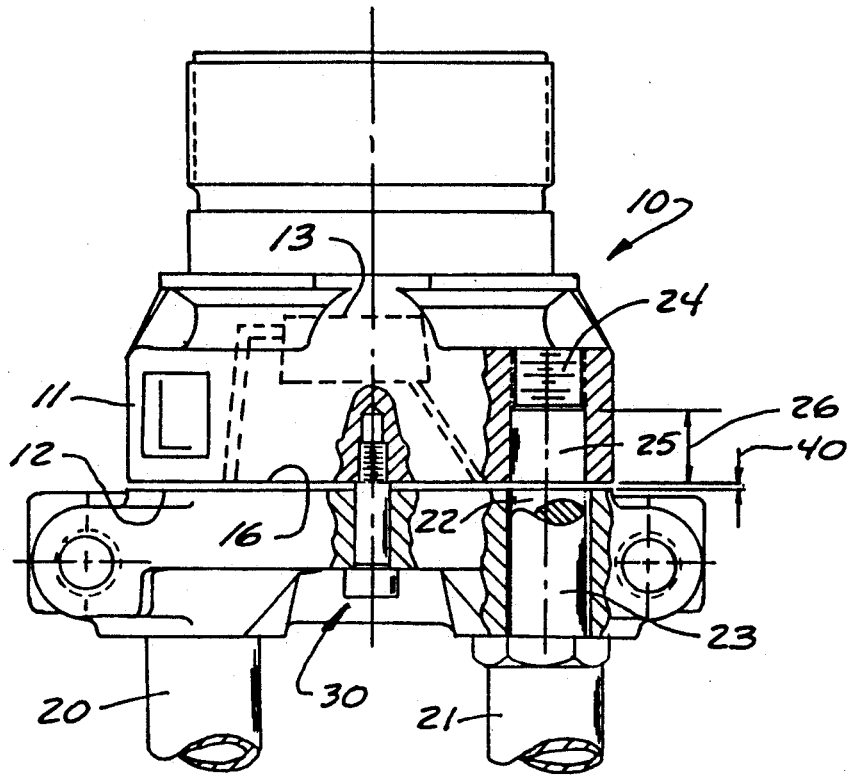
FIG. 1 is a top plan view of a typical transmitter having a sensor body, with a flange shown installed with support fasteners made according to the present invention.
Figure 2:
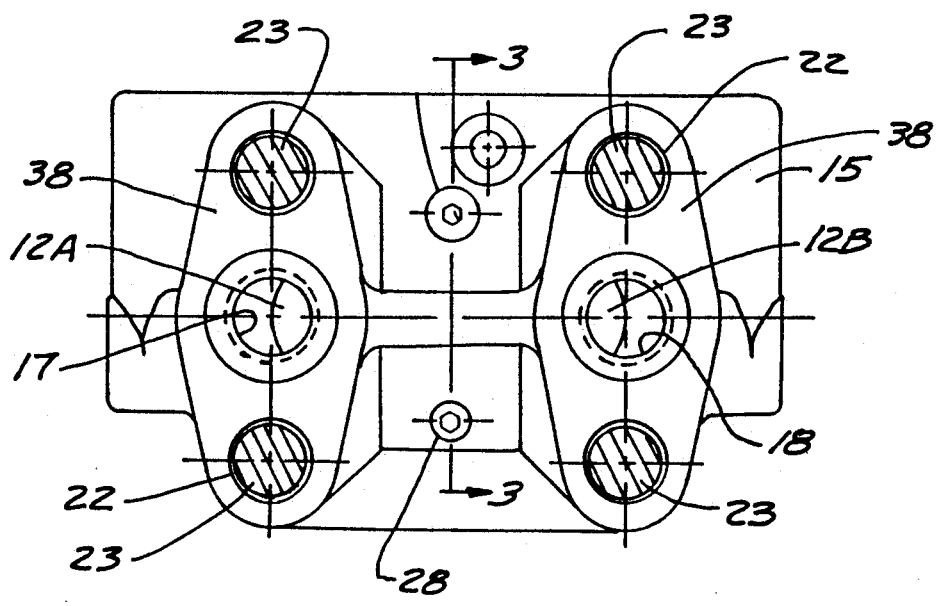
FIG. 2 is a front elevational view of the device of FIG. 1.

In FIG. 1, a typical process control transmitter 10, has a body 11, which houses a pressure sensor and which has a surface 12 which includes ports for receiving fluid under pressure. Such fluid pressure sensor is shown schematically in dotted lines of 13 on the interior of the body 11. Surface 12, as shown, is a planar surface, and in order to connect process lines of piping carrying the fluid under pressure to the ports in surface 12 (the ports are shown partially at 12A and 12B in FIG. 2), an adapter or flange indicated generally at 15 is coupled to the body. The flange 15 is called a coplanar flange and can be used for mounting different adapters and parts for pressure connections to the transmitter. Flange 15 has a surface 16 that faces and mates with the surface 12, and which can be sealed thereagainst. Through openings indicated at 17 and 18 are threaded at their outer surface for connecting one-quarter inch pipe thread pipes shown schematically in FIG. 1 at 20 and 21. The pipes are connected to sources of fluid under pressure that are to be measured.

Additionally, the flange 15 has, as shown, four through bores or bolt openings 22, for permanently fastening the flange 15 against the surface 12 and the sensor body 11 by threading fasteners, a first set of which is indicated at 23, into threaded bores 24 in the body. As shown, the threaded bores 24 are at the inner end of larger counter bores 25 that have a recessed length 26. The length of threaded bores 24 is adequate to have thread engagement sufficient to carry the loads required when the flange 15 is pressurized.

Figure 3:
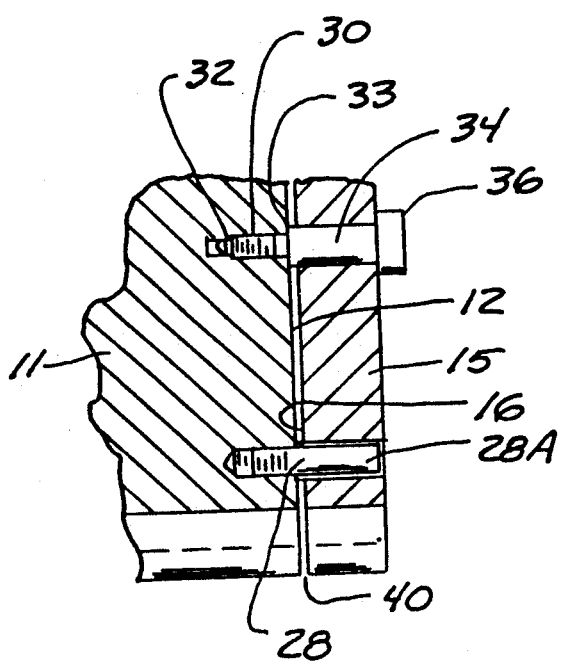
FIG. 3 is a fragmentary sectional view taken as on line 3—3 in FIG. 2.

In FIGS. 1 and 3, the flange 15 is shown without fasteners 23 secured for illustrative purposes. Fasteners for supporting the flange in place, but not for permanent installation are illustrated. A guide stud 28, and a shoulder bolt 30 which pass through openings respectively in the flange 15, and which in turn, as shown, are threaded into the body 11 are used. The stud 28 has a smooth shank 28A that slidably fits into an opening in the flange 15. The shoulder bolt 30, as shown, has a threaded end 32, and a smooth, larger diameter bolt length 34 which joins a shoulder surface 33. When the shoulder bolt is threaded into place, the shoulder 33 abuts against the surface 12. The smooth bolt length 34 of the shoulder bolt, between the surface 12 and the inner surface of a shoulder bolt head 36 is greater than the thickness of flange 15, measured between outer surface 38 and the surface 16. This insures that when surface 38 is urged against the inner surface of the shoulder bolt head 36, there is a gap as indicated at 40 between the surface 16 and surface 12. If fluid under pressure is provided through a connection 21, with only the alignment fasteners in place, the flange body interface will leak freely. The fluid will not pressurize the sensor body, the ports or passageways in the body, or the sensor 13. If pressure was permitted to build up, and only the prior alignment fasteners or screws are holding the flange in place, such as two threaded screws in place of the stud 28 and shoulder bolt 30, the unit could fail after pressure buildup. The pressure could be built up enough to provide an unwanted separation of the parts, and cause damage.

Thus, when a particular flange arrangement that has been shipped or used with the transmitter body, is to be changed and the standard bolts 23 are removed, the guide stud 28 and shoulder bolt 30, which are also installed at the factory, will support the flange 15 in alignment, but with a gap as indicated at 40. Seals are provided between flange 15 and surface 12 around the input ports in surface 12. The space 40 is large enough so the seals are not effective.

Figure 4:
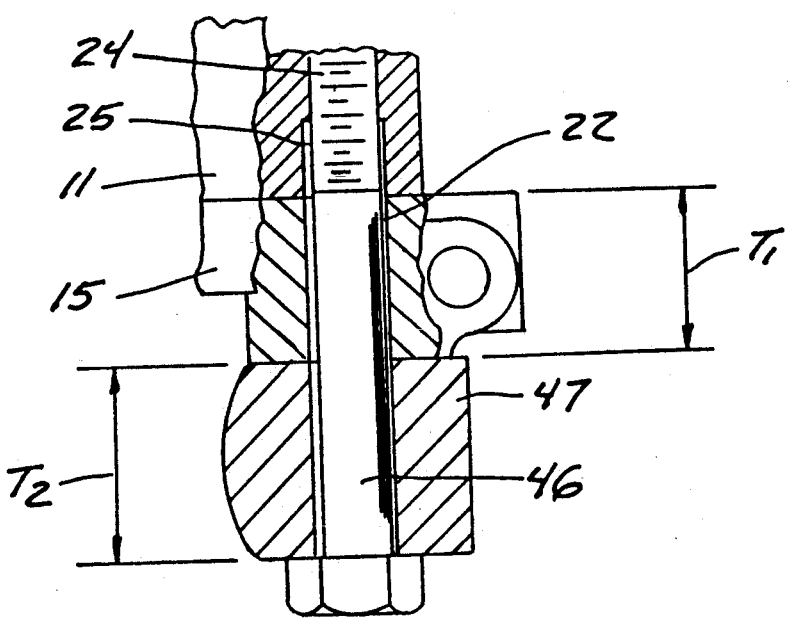
FIG. 4 is a sectional view of a flange adapter for a one-half inch pipe threads requiring a second fastener of different length.

As stated, different flange and adapter combinations can be used with the same transmitter body, and these combinations have different overall thicknesses, that is, different spacings between the surface 16 that mates with the surface 12 and the outer side surface of the supported members engaged by the permanent bolt heads. The bolts that are used for permanent fasteners thus have to be different lengths. For example, in FIG. 1, the first bolt 23 is illustrated with the flange 15, and can be threaded into the transmitter or sensor body. A second bolt shown at 46 in FIG. 4 is one bolt of a set of four and is used for a second thickness flange assembly. For example, the flange 15 may have a half-inch pipe thread adapter 47 thereon for a larger input connection. The combination of parts has a thickness such that the longer bolt 46 threads into the threaded portion 24 inwardly of the non-threaded counterbore 25. The length of the bolts 46 is selected to insure adequate engaged threads for holding the flange under operating pressure.

Figure 5:
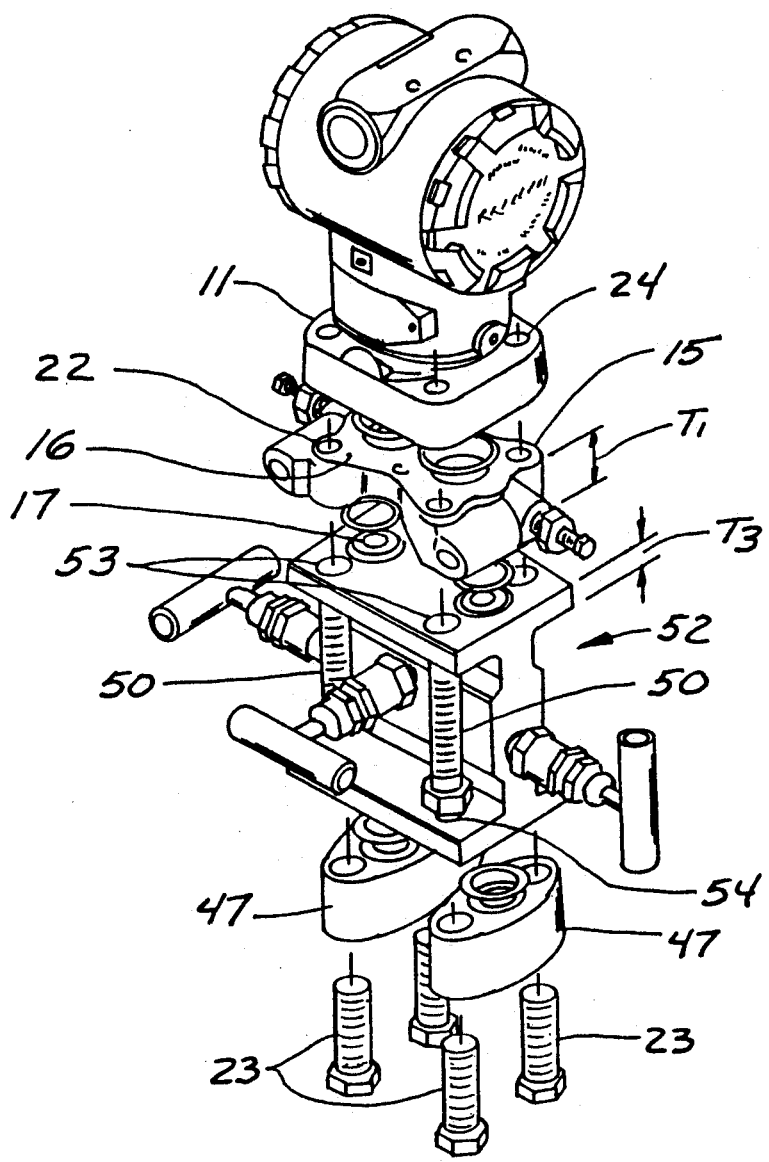
FIG. 5 is an exploded view of a transmitter having a three-valve manifold and flange adapter in position for installation with fasteners of a third length provided in a kit.

As shown in FIG. 5, with a three-valve manifold 52 illustrated schematically used in combination with flange 15, the thickness is such that third bolts 50 are used in order to reach the body bore threaded portions 24. Bolts 50 are shorter than bolts 46 as shown. The input side of the three-valve manifold 52 has a pair of adapters 47 that are attached with the standard bolts 23 to threaded bores 54 on the three-valve manifold. The adapters permit connection of input piping to the manifold 52.

The fastener bolts 50 pass through bores 53 in the attachment end of the three-valve manifold 52 and the bores 22 in the flange 15, and will thread into the threaded section 24 of the bores in the transmitter body 11. The bolts 50 are of length to fully engage the threads 24. The permanent bolts can pass through the threaded bores 24 if the bolts are longer than required resulting in full thread engagement but not sealing manifold 52 to flange 15. For example, if bolts 46 are used to secure flange 15 and manifold 52 to body 11, bolts 46 will bottom on body 11 before bottoming on manifold 52. Alternatively, if bolts 50 or 46 secure flange 15 to sensor body 11, the bolts will bottom on body 11 before bottoming on flange 15.

It can be seen that with the counter bore 25 inwardly from the surface 12, the threads of bolts 23 and 50 will not engage in the threaded portion 24 when the flange 15 and adapters 47 are in place and either of the bolts 23 and 50 are placed into the aligning bores in the adapters and flange 15 The bolts 23 will not engage in the threads 24 when the flange 15 and three-valve manifold 52 are in place and the bolts are passed through bores 53 and 22. Without the counter bore 25, it would be possible for some of the threads of bolt 50 to be engaged, even when the adapter 47 was in place, but the amount of engagement of threads would not be sufficient to carry the loads when the flange is pressurized and failure of the threads could occur. Also, without the counterbore, bolts 23 would engage a few threads if used in place of bolts 50 on the three-valve manifold and coplanar flange arrangement.

Each transmitter as disclosed is shipped with a kit of three sets of bolts for fastening flanges in place. The bolt sets are of the lengths shown at 23, 46 and 50. The bolts 23 are generally factory installed to hold coplanar flange 15, in place while the other sets are shipped in separate packages. The counter bore 25 is selected to be the proper length for the thickness of various flange combinations in relation to the bolt length provided, so that a wrong length bolt cannot be threaded into bore 24 at all, thereby insuring that a proper length of thread engagement will be provided for the permanent bolts. The temporary alignment fasteners are stopped in position to maintain the gap 40 so the flange will not be pressurized unless the correct length permanent attachment bolts are in place. Different flanges and adapters can be used and, of course, the bolts selected will be of length to correspond to such different flanges and adapters.

Even inattentive operators will install the correct permanent bolts, and will not leave the only temporary fasteners in place when pressurizing the system because the leakage resulting will warn the operator before pressure builds up.

As an example, to accomplish the objectives in one form of the invention, the thickness of the flange 15 end is $T_1$, the thickness of the adapter is indicated at $T_2$ and the lips or flange on the three-valve manifold having bores 53 is $T_3$. The axial length of counter bore 25 in this example is 0.429 inches. The relationship in Table I below shows the bolt lengths selected to avoid engagement of threads if an attempt to install a bolt length is made. Full thread engagement means substantially all threads in threaded section 24 are engaged.

TABLE I

| | THREAD ENGAGEMENT LENGTH | | |
|---|---|---|---|
| | BOLT LENGTH (INCHES) And Thread Engagement | | |
| ITEMS(S) | BL 1.75" | BL 2.25" | BL 2.88" |
| Coplanar flange ($T_1 = 0.845$") | Full | Full | Full |
| Coplanar flange ($T_1$ 0.845") and three-valve manifold ($T_3$ 0.430") | 0 | Full | Full |
| Coplanar flange ($T_1 = 0.845$") and flange adapter unions ($T_2 = 1.10$") | 0 | 0 | Full |

Although the present invention has been described with reference to preferred embodiments, workers skilled in the art will recognize that changes may be made in form and detail without departing from the spirit and scope of the invention.

What is claimed is:

1. An assembly of a fluid pressure receiving body and a flange for connecting an input fluid pressure to a port on a surface of such body comprising a flange having a thickness and an opening from a first connection side to a second side facing the surface of the body, wherein the improvement comprises alignment fastener means for retaining the flange including a retainer for stopping flange movement relative to the fastener means in direction away from the surface, the retainer stopping movement of the flange at a distance from the surface so the second side of the flange is spaced from the surface of the body.

2. The assembly of claim 1 wherein the alignment fastener means further comprises a guide separate from the retainer for orienting the flange in an operable position for alignment, the guide slidably engaging the flange to permit unrestricted movement of the flange away from the surface of the body along the guide.

3. An assembly of a fluid pressure receiving body and a flange for connecting an input fluid pressure to a port on a surface of such body comprising a flange having a thickness and an opening from a first connection side to a second side facing the surface of the body, wherein the improvement comprises alignment fastener means for retaining the flange including means operable between the fastener means and the body to prevent the fastener means from being adjusted so as to seal the second side of the flange against the surface of the body.

4. The assembly of claim 3 wherein the alignment fastener means further comprises a guide separate from other parts of the fastener means for orienting the flange in an operable position for alignment, the guide slidably engaging the flange to permit unrestricted movement of the flange outwardly from the surface of the body along the guide.

5. The assembly of claim 3 wherein the fastener means comprises a shoulder bolt having a shoulder seated against the surface on the body, and a head spaced from the surface a distance greater than the thickness of the flange, the flange being positioned between the head and the surface of the body.

6. The assembly of claim 3, and at least one adapter connectable to the first connector side of the flange, the flange having first fastener bores therein for receiving permanent fasteners separate from the alignment fastener means, the body having a plurality of body bores aligning with the fastener bores, each of the body bores having a counterbore with a length of unthreaded section and an inner threaded section for receiving first permanent fasteners passing through the first fastener bores, a set of first permanent fasteners for mounting the flange to the body, and at least one adapter connectable to the first connector side of the flange and having second fastener bores aligning with the first fastener bores in the flange and the bore in the body, a second set of permanent fasteners having a length to pass through the second fastener bores, the flange bores and to engage a desired length of the threaded bore section in the body, the counterbore length of the body bores being selected to insure that the fasteners of the first set of permanent fasteners will not reach the threaded section of the body bores when passed through a second fastener bore, and the aligning first fastener bore in the flange and into the aligning body bore.

7. A kit comprising a body for receiving fluid pressure, a flange, and at least two sets of threaded fasteners of different lengths, each set containing a plurality of threaded fasteners of the same length for permanently fastening the flange, and selected additional adapters in place on the body, the flange having a thickness and through flange bores usable with one of the sets of fasteners for fastening and sealing the flange against the surface of the body, the body having a plurality of body bores aligning with the flange bores and each body bore having a counter bore unthreaded section adjacent body surface and an inner threaded section for receiving a first set of fasteners passing through the flange bores so that the flange can be fastened to the body, the first set of fasteners being of length to engage a desired length of the threaded section of the body bores when passed through the flange bores, and at least one adapter connectable to a side of the flange opposite from the body and having second fastener bores aligning with the bores in the flange and body, the kit including a second set of fasteners having a length to pass through the second fastener bores, the flange bores and to engage a desired length of the threaded section, the counter bore length be selected to insure that the first set of fasteners will not reach the threaded section of the body bore when passed through the second fastener bores, the flange bores and into the body bore, respectively.

8. The kit of claim 7 and a second adapter connectable to the side of the flange opposite from the body in place of the one adapter and having third fastener bores aligning with the bores in the flange and body, a third set of fasteners having a length to pass through the third fastener bores, the flange bores and into the body bores, to engage the threaded length of the bores in the body, and said second adapter having third fastener bore lengths greater than the second fastener bore lengths, so that the fasteners forming the third set of fasteners are greater in length than the first and second sets of fasteners, the length of the third fastener bores being such that in relation to the length of the first and second fasteners, and the length of the counterbore such that the first and second fasteners, respectively, will not reach the threaded section of the bores in the body if passed through the third fastener bores, the flange bores, and into the body bore, respectively.

9. The kit of claim 7, and alignment fastener means for holding the flange onto the body when the first set of fasteners are removed, said alignment fasteners comprising fastener means which include a stop that stops tightening of the fasteners before the flange seats against the surface of the body in a pressure usable position.

10. A fluid pressure sensor receiving body having a pressure input port on a surface, and a flange facing such surface and providing through passageways for connection of pressure carrying fittings to a side of the flange opposite from the body and to the port, wherein the improvement comprises alignment means for holding the flange in alignment when permanent fasteners have been removed from the flange and body, said alignment means including a shoulder bolt that is threadable into the body and which has a head, said shoulder bolt having a shoulder surface engaging the surface of the body after passing through a provided opening in the flange, the shoulder bolt having an unthreaded section between the shoulder surface and a shoulder bolt head, the axial length of said unthreaded section being greater than the thickness of the flange mounted thereon whereby the flange is permitted to move away from the surface of the body before being stopped by the head of the shoulder bolt.

11. A fluid pressure sensor receiving body and flange of claim 10 and an alignment stud mounted on the body and slidably passing into an opening in the flange to stabilize the flange from rotation about the shoulder bolt, said stud being adapted to permit unrestricted movement of the flange outwardly from the surface of the body along the stud.

* * * * *

UNITED STATES PATENT AND TRADEMARK OFFICE
CERTIFICATE OF CORRECTION

PATENT NO. : 5,248,167
DATED : September 28, 1993
INVENTOR(S) : William E. Petrich and Charles A. Glaser It is certified that error appears in the above-indentified patent and that said Letters Patent is hereby corrected as shown below:

Col. 6, line 39 cancel "bore" and insert --bores--.

Signed and Sealed this

Twenty-seventh Day of September, 1994

Attest:

BRUCE LEHMAN

Attesting Officer

Commissioner of Patents and Trademarks